United States Patent [19]

Weber

[11] 4,248,826

[45] Feb. 3, 1981

[54] INJECTION MOLDED BALATA SHELL

[75] Inventor: Fred H. Weber, Ashland, Ohio

[73] Assignee: Fred H. Weber Co., Inc., Ashland, Ohio

[21] Appl. No.: 71,127

[22] Filed: Aug. 30, 1979

[51] Int. Cl.³ .............................................. B29F 1/08
[52] U.S. Cl. .............................. 264/328.14; 156/146
[58] Field of Search .................... 264/329; 260/816 R, 260/816 G; 156/146

[56] References Cited

U.S. PATENT DOCUMENTS

| | | | |
|---|---|---|---|
| 5,592 | 5/1848 | Brooman | 264/106 |
| 24,996 | 8/1859 | Wolfe | 264/329 |
| 1,382,774 | 6/1921 | Geer | 264/126 |
| 1,904,012 | 4/1933 | Reichard | 156/146 |
| 1,996,880 | 4/1935 | Reach | 154/17 |
| 2,082,304 | 6/1937 | Stam | 106/23 |
| 2,259,349 | 10/1941 | Merrill | 273/62 |
| 2,363,086 | 11/1944 | Ryan | 154/18 |
| 2,572,438 | 10/1951 | Branson | 264/106 |
| 2,649,622 | 8/1953 | Piccard | 264/106 |

Primary Examiner—V. P. Hoke
Attorney, Agent, or Firm—Mack D. Cook, II

[57] ABSTRACT

Improvements in a process for use in the manufacture of hemispherical shells for covering a golf ball center or core. The process includes the injection of a warm plasticized compound into a mold cavity in the form of a hemispherical shell. The improvements are that prior to plasticizing and injection into the mold cavity: the compound has as a dominant constituent, a trans 1,4-chain polymer of isoprene (balata, gutta-percha or synthetic transpolyisoprene); the compound is milled into a strip; and, the milled compound strips are granulated into particles.

2 Claims, No Drawings

INJECTION MOLDED BALATA SHELL

BACKGROUND OF THE INVENTION

This invention relates to improvements in the making of hemispherical shells of "balata" for covering the core or center of a golf ball. The physical properties of balata articles have been known since at least 1848. The use of compounds having balata as the dominant constituent for the making of golf ball cover shells was specifically disclosed at least as early as 1933.

Balata is considered by chemists to be a "rubber." Analyses of rubber indicate the empirical formula $(C_5H_8)n$; meaning a hydrocarbon made-up of a number of isoprene units. It has been determined that the isoprene units are linked head-to-tail; meaning a 1,4-chain polymer of isoprene.

The literature also refers to gutta-percha. Balata and gutta-percha are probably identical, and they have the same empirical formula as rubber. The balata hydrocarbon, like rubber, is a 1,4-chain polymer of isoprene, but has very different physical properties. Balata is a nonelastic, tough, thermoplastic solid; when heated and molded and cooled, it retains the shape of the mold cavity and does not retract to its original form. Balata can be vulcanized under conditions more drastic than those required for rubber, but without significant changes in physical properties.

Chemists using X-ray diffraction techniques have determinated a reason for the difference between the physical properties of rubber and balata or gutta-percha. It is now accepted in the art that the formulation of rubber is the cis form of a 1,4-chain polymer of isoprene, and the formulation of balata or gutta-percha is the trans form of a 1,4-chain polymer of isoprene.

The physical properties of balata, which provide a highly desirable compound for golf ball cover shells, have also compelled the art to use expensive and time-consuming techniques for both compound formulation and subsequent shell formation. At present, balata shells for golf ball covers are made using compression molding techniques. According to the invention, balata shells with optimum uniformity and lighter weight can be made faster, with reduced compound and direct labor costs, using injection molding techniques.

PRIOR ART STATEMENT

The following prior art statement is incorporated in this specification pursuant to 37 C.F.R. §1.97 and has been prepared according to 37 C.F.R. §1.98.

I. U.S. Pat. No. 5,592, 1848, Brooman (of London, England), relates to the making of articles of gutta-percha by molding, stamping or embossing. In granular applications, gutta-percha may be rasped down to a powder.

II. U.S. Pat. No. 24,996, 1859, DeWolfe, describes the molding of gutta-percha articles using a powder of vulcanized gutta-percha as a mold lubricant.

III. U.S. Pat. No. 1,382,774, 1921, Geer, describes breaking up a sheet, slab or mass of rubber, preferably in the warm state, as by slitting into strips and chopping the strips into short lengths.

IV. U.S. Pat. No. 1,904,012, 1933, Reichard, discloses a golf ball having a liquid or semi-liquid filled core with a cover formed by balata hemispherical shells 3 joined at their annular edges by heat and pressure.

V. U.S. Pat. No. 1,996,880, 1935, Reach, discloses a golf ball with an expanded center of rubber windings using two pairs of interfitting thin balata hemispheres, 3 and 4.

VI. U.S. Pat. No. 2,082,304, 1937, Stam, defines the word "rubber" as also including "gutta-percha, balata, and similar gums, and also artificial and reclaimed rubber if obtained from latices or latex-like fluids." This patent also attests that mixing a fine dry gutta-percha or balata powder with fillers, vulcanizing agents, accelerators, etc., is current state of the art knowledge.

VII. U.S. Pat. No. 2,259,349, 1941, Merrill, is considered particularly relevant as showing the most recent thinking on the subject of balata golf ball covers, prior to this application. A golf ball may be manufactured from a material comprising an unvulcanized compound selected from the group consisting of balata, gutta-percha and condensation derivatives of rubber, mixed with discrete particles of a vulcanized soft rubber powder, substantially all of which powder will pass through a 50-mesh screen.

VIII. U.S. Pat. No. 2,363,086, 1944, Ryan, relates to golf ball cores or centers. The process for manufacturing the gutta-percha cover is not described.

IX. U.S. Pat. No. 2,572,438, 1951, Branson, has a general disclosure of the compression molding of a powdered rubber compound.

X. U.S. Pat. No. 2,649,622, 1953, Piccard, which has no drawings, has a broad spectrum disclosure for the molding of synethetic linear polyester compounds. The applicant understands that the compound described ("polyethylene terephthalate") is being used commercially in the manufacture of the "solid" golf ball. This patent also includes a state of the art definition of the differences between "compression molding" and "injection molding" techniques.

The above-identified prior art patents became known to the inventor after a search was made in Class 156, subclasses 146, 245; Class 260, subclasses 768T, 816R, 816G; Class 264, subclasses 125, 126; and, Class 273, subclass 231.

SUMMARY OF THE INVENTION

It is an object of the invention to provide improvements for the manufacture of hemispherical shells for covering a golf ball center or core.

It is a further object of the invention to provide a shell for a golf ball cover which is nonelastic and tough, uniform in thickness and preformed dimensions, light in weight, and relatively inexpensive.

Still further, it is an object of the invention to provide a series of process steps permitting the economical and efficient use of an injection molding technique to manufacture a shell for a golf ball cover from a compound having as the dominant constituent a trans 1,4-chain polymer of isoprene (balata, gutta-percha or synthetic transpolyisoprene).

These and other objects and advantages of the invention will be apparent in view of the following detailed description.

In general, in a process used for the manufacture of hemispherical shells for covering a golf ball center or core, a process including the injection of a warm plasticized compound into a mold having one or more cool cavities in the form of the hemispherical shell, the improvement of the invention contemplates that prior to plasticizing and injection of the compound into a mold cavity:
  (a) the compound is formulated to have as the dominant constituent or ingredient a trans 1,4-chain polymer of isoprene (balata, gutta-percha or synthetic transpolyisoprene); then,
  (b) the formulated compound is milled into a strip having the approximate dimensions of 4" to 30" wide and ⅛" to ¼" thick; and then, (c) the milled strip is granulated into cubes having the approximate maximum dimensions of no greater than 1/32" to ⅜" on a side.

DETAILED DESCRIPTION OF THE INVENTION

According to the invention, a hemispherical shell for use in covering a golf ball center or core is made using a conventional injection molding technique. Balata hemispherical shells 3 joined at their annular edges by heat and pressure to form a golf ball cover are disclosed in U.S. Pat. No. 1,904,012, 1933, Reichard. Each hemispherical shell is formed in a closed mold cavity which is kept cold, to set or harden the shell, by the injection under pressure of a warm plasticized compound. A description of injection molding techniques may be found in U.S. Pat. No. 2,649,622, 1953, Piccard.

The compound used to make the hemispherical shells is formulated to have as the dominant constituent or ingredient a trans 1,4-chain polymer of isoprene. The polymer may be a naturally occurring balata or gutta-percha, or a synthetic transpolyisoprene, or mixtures thereof. Major or significant amounts of the chosen polymer may be mixed with minor amounts of rubber extenders, inorganic fillers, coloring agents, and accelerator and vulcanizing agents, in a conventional manner in known ways. A description of mixing a trans 1,4-chain polymer of isoprene with other constituents or ingredients may be found in U.S. Pat. No. 2,082,304, 1937, Stam.

Until the present invention, the state of the art has been such that a hemispherical shell could not be made, in commercial quantities and at competitive costs, from a compound having as the dominant constitutent a trans 1,4-chain polymer of isoprene using injection molding techniques.

The invention further contemplates that mixing of the formulated compound constituents or ingredients be accomplished by processing on a rubber mill or other conventional rubber mixing device. See U.S. Pat. No. 2,259,349, 1941, Merrill. It is critical that the formulated compound be delivered from the mill in the form of a strip or narrow and thin slab. It has been found, and it is therefore preferred and specified, that a milled strip of the formulated compound should have the approximate dimensions of 4" to 30" wide and ⅛" to ¼" thick.

The invention further contemplates that the milled strip of the formulated compound be reduced in size, using granulator apparatus that will form six-sided cubes, with a minimum of impalpable powder or fines. It has been found, and it is therefore preferred and specified, that cubes of the formulated and milled compound should have the approximate dimensions of 1/32" to ⅜" on a side. The granulator apparatus may be of a conventional two-stage cutting/shearing design. During the first stage cutting action a milled strip of formulated compound is passed through a set of cylindrical knives at a constant feed rate to produce narrower strips. Thereafter, the sliced compound strips are crosscut by a rotor equipped with adjustable knives set at an angle. Or, the granulator apparatus could be of the type known in the art as the Spout-Waldron rotary knife cutter.

With reference to the injection molding technique, the plasticizing temperature of the formulated, milled and granulated compound within the injection molding apparatus is also critical. It has been found, and it is therefore preferred and alternatively specified, that the temperature of the warm plasticized compound be maintained below 250° F. until injection thereof into a cool mold cavity.

After each hemispherical shell has been removed from the mold cavity of the injection molding apparatus, the article pre se is suitable for use in the production of a golf ball, using known and conventional techniques. See U.S. Pat. No. 1,996,880, 1935, Reach.

What is claimed is:

1. In the process for the manufacture of the hemispherical shells for covering a golf ball core, each said shell being of a formulated compound having as the dominant constituent a trans 1,4-chain polymer of isoprene (balata, gutta-percha or synthetic transpolyisoprene), the improvement comprising the steps of: milling said formulated compound into a strip having the approximate dimensions of 4" to 30" wide and ⅛" to ¼" thick; granulating said milled strip of compound into small cubes, with a minimum of impalpable powder of fines; and, injection molding said milled and granulated compound as a plasticized compound into a mold having one or more cool cavities in the form of said hemispherical shell, at a temperature which is maintained below 250° F.

2. An injection molded hemispherical shell for convering a golf ball core, manufactured according to the process of claim 1.

* * * * *